2,969,389

TRANS-p-CHLORO-α-METHYLCINNAMIC ACID

Donald G. Kundiger and Gene F. Morris, Manhattan, Kans., assignors to The Dow Chemical Company, Midland, Mich., a corporation of Delaware No Drawing. Filed Oct. 6, 1958, Ser. No. 765,292

2 Claims. (Cl. 260—515)

This invention relates to trans-p-chloro-α-methylcinnamic acid having the formula

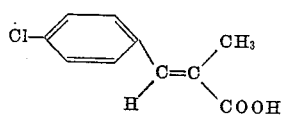

and to a method for preparing the same.

Trans-p-chloro-α-methylcinnamic acid is a white crystalline solid soluble in organic solvents such as acetone, ethanol, xylene, benzene and petroleum ether, and in aqueous alkali; and substantially insoluble in water.

Trans-p-chlorocinnamic is useful as a parasiticide, particularly for the control of fungal organisms.

According to this invention, it has been discovered that trans-p-chloro-α-methylcinnamic acid may be prepared in good yields and in high purity by a novel method wherein 3,3-dichloro-2-methylacrolein having the formula

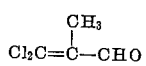

and chlorobenzene having the formula

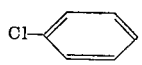

are reacted in the presence of concentrated sulfuric acid to form an intermediate trans-p-chloro-α-methylcinnamyl chloride and hydrogen chloride by-product followed by hydrolysis of the trans-p-chloro-α-methylcinnamyl chloride intermediate. The reaction is believed to take place through the following sequence of steps:

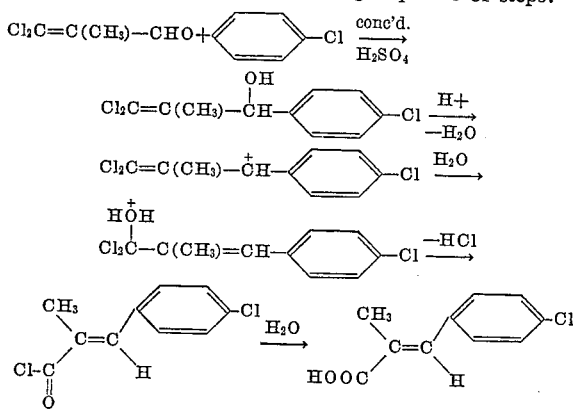

In carrying out the reaction, substantially equimolar proportions of 3,3-dichloromethylacrolein and chlorobenzene are mixed together and a concentrated (94 percent to 100 percent) sulfuric acid added thereto and the mixture heated to produce the intermediate trans-p-chloro-α-methylcinnamyl chloride. The latter is then hydrolyzed with water to produce the desired trans-p-chloro-α-methylcinnamic acid. The latter may be recovered and purified by conventional methods.

The exact amounts of the reactants are not critical and good results may be obtained by employing substantially equimolar proportions of 3,3-dichloro-2-methylacrolein, chlorobenzene and concentrated sulfuric acid. The preferred amounts are a slight molar excess of chlorobenzene with respect to 3,3-dichloro-2-methylacrolein and a substantial molar excess of concentrated sulfuric acid. Generally, a two to three-fold molar excess of the acid is considered preferable.

The reaction may be carried out in the temperature range of from about 15° C. to 100° C. The reaction is preferably carried out by mixing the reactants at room temperature and thereafter heating the mixture. During the heating, one equivalent of hydrogen chloride is liberated and evolved from the reaction mixture with the formation of the intermediate acid chloride. The hydrolysis of the intermediate acid chloride is conveniently carried out by diluting the reaction mixture with water. This may be water, ice-water, ice or steam. When the water is steam, the reaction mixture is conveniently steam distilled.

In a preferred method for carrying out the reaction, approximately equimolar proportions of 3,3-dichloro-2-methylacrolein and chlorobenzene are mixed together and excess concentrated sulfuric acid added thereto portionwise with stirring at ambient temperature. The resulting mixture is then heated in the temperature range of from 70° C. to 100° C. for a period of from about 4 hours to 24 hours. Thereafter, the mixture is diluted with water to precipitate the trans-p-chloro-α-methylcinnamic acid. The latter may be recovered and purified by conventional methods.

A representative operation is demonstrated by the following example.

25 grams (0.25 mole) of concentrated sulfuric acid was added with stirring over a period of one hour to a mixture of 14 grams (0.10 mole) of 3,3-dichloro-2-methylacrolein and 14 grams (0.13 mole) of chlorobenzene. The resulting mixture was stirred for 16 hours and then heated to 80° C. and the stirring continued for 24 hours. During the period of heating one equivalent of hydrogen chloride (as determined by titration) was evolved from the reaction mixture. After completion of heating, the mixture was poured over cracked ice whereupon a trans-p-chloro-α-methylcinnamic acid product precipitated as a white solid. The latter, amounting to 3 grams, was recovered by filtration. The filtrate was steam distilled to remove the excess chlorobenzene and to obtain additional 5 grams of a trans-p-chloro-α-methylcinnamic acid product as residue. The latter was dissolved in ethanol, purified with activated charcoal and recrystallized from 95 percent ethanol to obtain a purified product. The melting point of the trans-p-chloro-α-methylcinnamic acid product was 168°–169° C. The product had a carbon content of 60.67 percent, a hydrogen content of 4.54 percent and a chlorine content of 18.16 percent. The theoretical values are 61.05 percent, 4.58 percent and 18.07 percent, respectively. The neutral equivalent was found to be 197. The theoretical value is 196.5. The total yield of the product amounted to 40 percent.

The structure of trans-p-chloro-α-methylcinnamic acid was established by an independent synthesis via the Perkin reaction by heating together p-chlorobenzaldehyde and propionic anhydride. The trans-p-chloro-α-methylcinnamic acid obtained by this procedure melted at 167°–169° C. No depression of melting point was observed by mixing the product thus obtained with the product obtained according to the present invention.

As further structure proof, the product prepared according to the present invention was oxidized with aqueous potassium permanganate to produce p-chlorobenzoic acid melting at 245°–246° C. The latter gave no melting point depression with an authentic sample of p-chlorobenzoic acid.

Trans-p-chloro-α-methylcinnamic acid is useful as a parasiticide and is adapted to be employed for the control of bacterial and fungal organisms. In a representative operation of its use as a fungicide, complete inhibition of growth of the fungal organisms, *Aspergillus terreus*, *Penecillium digitatum* and *Rhizopus nigricans* were obtained when yeast agar medium containing 0.1 percent by weight of trans-p-chloro-α-methylcinnamic acid was plated, streaked with the above organisms and incubated at 30° C. for 3 days.

We claim:

1. A method for the preparation of trans-p-chloro-α-methylcinnamic acid having the formula

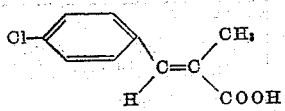

which comprises mixing together at room temperature 3,3-dichloro-2-methylacrolein and chlorobenzene in the presence of a concentrated sulfuric acid, and thereafter heating the reaction mixture to a temperature not in excess of 100° C. wherein hydrogen chloride is liberated and evolved therefrom to produce an intermediate trans-p-chloro-α-methylcinnamyl chloride, followed by hydrolysis of the latter with water.

2. A method for the preparation of trans-p-chloro-α-methylcinnamic acid having the formula

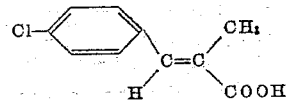

which comprises mixing together substantially equimolar proportions of 3-3-dichloro-2-methylacrolein and chlorobenzene, adding a substantial molar excess of concentrated sulfuric acid thereto, heating the resulting mixture for a period of from about 4 hours to 20 hours at a temperature in a range of from 70° to 100° C., and thereafter diluting the mixture with water.

References Cited in the file of this patent
Matell Acta Chem. Scand., vol. 9, p. 707 (1955).